L. Fogg,
Buckle,

No. 1,522. Reissued Aug. 11, 1863.

Witnesses.
J. W. Coombs
R. S. Spencer.

Inventor.
Luther Fogg
per Munn & Co
attorneys.

N. PETERS, PHOTO-LITHOGRAPHER, WASHINGTON, D. C.

UNITED STATES PATENT OFFICE.

FREDERICK STEVENS, OF NEW YORK, N. Y., ASSIGNEE OF LUTHER FOGG.

IMPROVED BUCKLE.

Specification forming part of Letters Patent No. 38,793, dated June 2, 1863; Reissue No. 1,522, dated August 11, 1863.

*To all whom it may concern:*

Be it known that LUTHER FOGG, of Boston, in the county of Suffolk and State of Massachusetts, did invent a new and Improved Buckle; and I do hereby declare that the following is a full, clear, and exact description thereof, reference being had to the accompanying drawings, making a part of this specification, in which—

Figure 1:
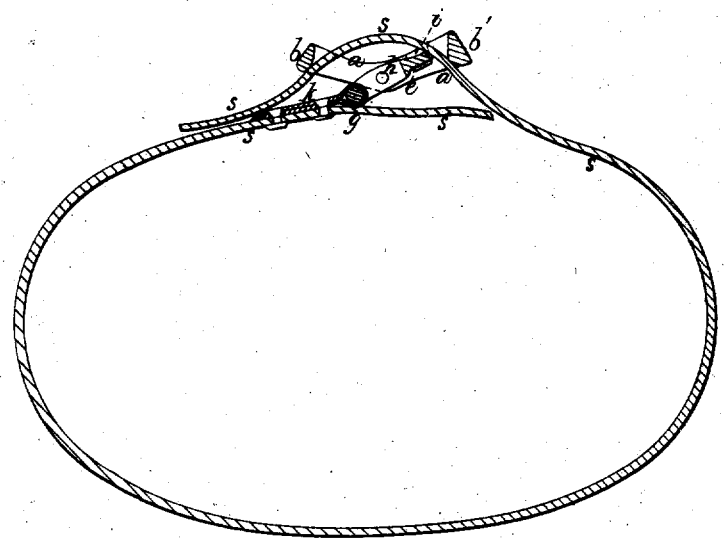
Figure 2:
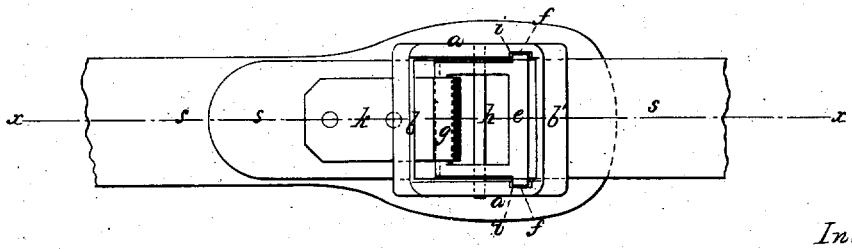

Figure 1 is a longitudinal section through the buckle and the strap to which it is supposed to be attached. In this figure certain parts of the buckle are lifted from the position they ought properly to occupy to show more clearly the construction and operation of the several parts. Fig. 2 is a plan or top view of the buckle, with the strap to which it is supposed to be attached delineated in red.

The same letters are used in each figure to designate the same parts.

The object of this invention is to supply a buckle which will grasp and hold the strap in the firmest manner at any desired point and at any required tension without requiring or producing a perforation of its substance, and capable of being manipulated with the greatest promptness and facility. Buckles with teeth or points penetrating the substance of the strap necessarily soon weaken it by cutting and separating the fibers or substance of the strap. In straps with holes cut or punched at certain regular distances apart to receive the point of the tongue of the buckle, it is evident that injury is done to the strength of the strap by these cuts or holes, while the tension of the strap itself must necessarily be intermittent and dependent upon the distance between the several holes, besides which it is always necessary to draw the strap beyond the limits of its subsequent tension to enable the tongue to enter the orifices prepared for its reception, and to repeat the same operation when the strap is to be loosened or removed. By my invention these objectionable features in all ordinary buckles are entirely removed. With one hand only the strap with my buckle attached can be drawn just to the tension required, where it will be held firmly and immovably for the time required, without injury to the strap, and when it is necessary to loosen it, a slight movement disengages the grasp of the buckle and entirely frees the strap.

To enable others skilled in the art to make and use my invention, I will proceed, with the assistance of the drawings, to describe its construction and operation.

The buckle consists of three essential parts as a whole—that is, a frame, a tongue, and a shank—united and operating in a manner that will be fully set forth in and with the description of these several parts.

The frame is designated in the drawings by the letters *a a*, *a′ a′*, *b*, and *b′*, the tongue by the letter *e*, and the shank by *k*. In the plan view, Fig. 2, the frame appears to be a flat square, or nearly so, but by reference to Fig. 1, which is a vertical section through the buckle, it will be seen that the sides are bent or curved at or near their center or middle, causing the posterior parts, *a′ a′*, or those toward the end *b* to form an angle, say of thirty to forty-five degrees, with the anterior parts, *a a*, toward *b′*, both of these several portions of the side being in line—that is, the anterior portions, *a a*, being in one plane, and the posterior, *a′ a′*, in another. Exact conformity to this is not, however, absolutely necessary. All that is necessary to carry out the principle or idea in the construction of this part of the device is to give an elevation to the part or bar *b* for purposes that will be explained. A section of the front end, part, or bar, *b′* has a triangular shape, with the angles or corners rounded off, as shown in Fig. 1. I make the inner face of this end piece or bar, *b′*, sloping, as shown in the same figure, to allow the tongue to come down freely to its proper position or to escape when the strap or buckle is manipulated for either of these purposes. The form of the other faces of the part or bar *b′* is not material. No particular function results from the form of the other end piece or bar *b*. It may, therefore, be round, square, oval, or any other form. Its section in Fig. 1 shows a half-oval. At the bend or angle of the sides there is an orifice to receive the ends of the pin or rod *h*, and on the inside, near the bar or end piece, *b′*, there is in each one of these sides a notch or recess, *i i*, intended to receive the lugs or pins *f f* on the side of tongue. The tongue has also four sides—the front *e*, which is flattened out to form the gripper; the back part or bar, *g*, which is round or rounded to form the pivot of attachment with the skank *k*, and the two side pieces, *e′ e′*, as seen in Fig. 2, which connect the end pieces, *e* and *g*, together. On the ends of *e* are lugs or pins *f f*, Fig. 2, which fall into the notches or recesses *i i* in the sides of the frame. The front edge of the tongue *e* that grips the strap I bevel or groove, as seen in Fig. 1. Each side piece, *c c*, of the tongue has a hole or passage through it for the pivot or rod *h*, which forms the connection between the frame and the tongue. The shank *k* may be merely a flat strip of brass, copper, or other appropriate material, bent back upon itself and around the posterior part, *g*, of the tongue and perforated with one or more rivet-holes for the attachment of the buckle to the strap. Of course the pipe formed by the bending of the sheet metal around *g*, or otherwise, must be large and loose enough to allow the latter to rotate freely therein.

The letters *s s s s* indicate the strap to which the buckle is supposed to be attached, and the line *x x*, Fig 2, that of the section represented in Fig. 1.

Instead of the connecting-rod *h*, pins may be made upon the side *c* of the tongue to be received into cavities or perforations in the sides of the frame, or the pins may be on the frame to be received into perforations or cavities in the sides of the tongue. In either of these cases it is only necessary to spring out the sides of the frame until the pins can enter their respective cavities, when the sides of the frame will close or may be made to close back to their proper position.

In all buckles heretofore constructed of three parts—a frame, a tongue, and a shank, each a distinct part of the whole—there is but one line of action or one center of motion—that is, the frame, the tongue, and the shank all play upon one axis.

In my improved buckle it will be seen that there are two lines of motion and consequently two axes—one between the frame and tongue and one between the tongue and shank. The latter, therefore, is the center or fulcrum upon which the tongue moves, and the former the connection by which it may be moved or caused to vibrate through the agency of the frame. If the tongue be allowed to drop into its place with the lugs *f f* resting in the notches *i i*, simply drawing the frame slightly backward will lift it from this position and open a free passage between it and the bar *b′* for introducing the end of the strap. When this is done and a pull is made upon the strap, the frame is brought forward and necessarily the tongue comes down again and grips the strap. By giving a slope to the interior face of the bar *b′* the strap can be pulled to a certain extent out of the way of the anterior edge of the part *e*, and thus allow it to fall lower and get a better grip of the strap against the bar *b′* than it could if not so constructed; and I further facilitate this by making the tongue a little shorter than the distance between this face *b′* and the pipe of the shank; but when the draw upon the strap for tightening it is suspended, and the strain is thrown in full force upon the tongue of the buckle, this shortening of the tongue might render it liable to be drawn through, permitting the escape of the strap, if it were not for the lugs *f f*, which, taking into the recesses or notches *i i*, effectually prevent such a result. It may be proper here to say that these lugs might be on the sides of the frame, and the recesses on the tongue, or a bar be passed entirely across the frame at this place, without altering the principle of my improvement on this point. It is obvious that when these lugs or points are brought down firmly into these notches the tongue can go no further, and this occurring when the buckle is exercising its most powerful grip upon the strap, no escape of this can take place without the rupture or break of it or the buckle. If the front or gripping edge of the tongue were, however, merely flat, rounded, or sharp, a powerful strain on the strap might draw through and loosen it. In many cases, as in skate-straps, or girths for saddles, &c., this might be a dangerous occurrence, and to obviate it I make this edge with a shallow groove or double bevel. The edges of this grove or bevel should not be sharp enough to cut the strap, and the groove only deep enough to allow them to make a strong indentation into it. As the lower edge or angle of the bar *b′*, over which the strap is drawn, is rounded and smooth, if the gripping-edge of the tongue be properly constructed the wear of the strap will be very slight, even from long and constant use.

The objects obtained by giving the back or posterior, portion, *a′ a′*, of the frame or upward bend or curve are twofold: First, it thereby becomes a strong, always open, and easily eyed loop, for holding the free end of the strap; second, a means of unbuckling or releasing the strap with facility. If the compression of the strap be not very great, it may be released in the same manner as was described for lifting the tongue for the first passage of the end of the strap—that is, by drawing the frame backward; but where the compression is very strong, this becomes difficult, in consequence of the tightness of the grip between the tongue and the part *b′*. In consequence, however, of the peculiar connection of the frame with the tongue through the pivot *h*, the frame becomes a lever, and, by lifting its posterior end, it necessarily raises the anterior or gripping edge, *e*, of the tongue, thereby releasing its hold upon the strap.

Instead of making the tongue as described, of an anterior, posterior, and side pieces, the whole might form but one piece, with the lugs *f f*, hole or passage for the pivot *h*, and one or more lugs at the posterior edge for forming the connection with the shank, but this and other such alterations would be mere modifications of the principle contemplated in my improvement.

Having thus fully described the construc-tion and operation of this invention, what I claim therein and desire to secure by Letters Patent of the United States, as the invention of the said LUTHER FOGG, is—

1. The curved frame *a a*, swinging on its axis *h* at or near its centers, provided with stops *i i* and with the anterior front, *b'*, beveled, all as set forth.

2. The grooved tongue *e*, with its lugs *f f*, working on its own axis *g* and furnished with the axis *h*, upon which the curved frame *a a* is hinged, all as set forth.

3. The shank K, when rigidly attached to the strap, in combination with and hinged to the posterior bar, *g*, of the tongue *e*, substantially as described.

4. The combination of the curved frame *a a* with its stops *i i* and beveled front *b'*, with the grooved tongue *e* and its lugs *f f*, and the rigidly-attached shank *k*, substantially as set forth.

FREDERICK STEVENS.

Witnesses:
ANDREW J. PHILLIPS,
J. B. WESTERVELT.